(12) United States Patent
Bale et al.

(10) Patent No.: US 7,254,130 B1
(45) Date of Patent: Aug. 7, 2007

(54) PREDICTIVELY ALLOCATED BANDWIDTH IN A COMMUNICATIONS NETWORK

(75) Inventors: Melvyn C Bale, Ipswich (GB); Juan R Harrison, Billericay (GB)

(73) Assignee: British Telecommunications public limited company, London (GB)

( * ) Notice: Subject to any disclaimer, the term of this patent is extended or adjusted under 35 U.S.C. 154(b) by 849 days.

(21) Appl. No.: 09/959,957

(22) PCT Filed: Jun. 8, 2000

(86) PCT No.: PCT/GB00/02214

§ 371 (c)(1),
(2), (4) Date: Nov. 13, 2001

(87) PCT Pub. No.: WO00/78088

PCT Pub. Date: Dec. 21, 2000

(30) Foreign Application Priority Data

Jun. 11, 1999 (EP) .................. 99304560

(51) Int. Cl.
*H04L 12/66* (2006.01)
*H04L 12/28* (2006.01)
*H04J 3/16* (2006.01)

(52) U.S. Cl. .................. 370/356; 370/395.21; 370/468
(58) Field of Classification Search ................ 370/468, 370/352–356, 401, 463, 466, 335, 342, 395.21
See application file for complete search history.

(56) References Cited

U.S. PATENT DOCUMENTS

| 5,065,392 | A |   | 11/1991 | Sibbitt et al. |
|---|---|---|---|---|
| 5,345,445 | A |   | 9/1994 | Hiller et al. |
| 5,559,877 | A | * | 9/1996 | Ash et al. ............... 379/201.05 |
| 5,592,470 | A | * | 1/1997 | Rudrapatna et al. ........ 370/320 |
| 5,673,253 | A | * | 9/1997 | Shaffer ........................ 370/229 |
| 5,978,387 | A | * | 11/1999 | Sherman ...................... 370/468 |
| 6,125,105 | A |   | 9/2000 | Edwards et al. |
| 6,208,640 | B1 | * | 3/2001 | Spell et al. .................. 370/358 |
| 6,249,530 | B1 | * | 6/2001 | Blanco et al. ............... 370/468 |
| 6,331,986 | B1 | * | 12/2001 | Mitra et al. .................. 370/468 |
| 6,373,860 | B1 | * | 4/2002 | O'Toole et al. ............. 370/493 |

(Continued)

FOREIGN PATENT DOCUMENTS

JP            8-503344         4/1996

(Continued)

OTHER PUBLICATIONS

Varvarigos et al, "An Efficient Reservation Connection Control Protocol for Gigabit Networks", Computer Networks and ISDN Systems, Jul. 13, 1998, vol. 30, No. 12, XP004129614, pp. 1135-1156.

(Continued)

*Primary Examiner*—Chi Pham
*Assistant Examiner*—Melanie Jagannathan
(74) *Attorney, Agent, or Firm*—Nixon & Vanderhye P.C.

(57) ABSTRACT

In a broadband communications network, bandwidth is allocated to bearer channels for a circuit connected service, such as narrowband telephony. The allocated bandwidth is changed automatically as a function of time so as to track expected changes in demand for bearer channels. When the number of allocated channels falls from its peak value, then at the access node some of the channels may be marked as blocked.

7 Claims, 5 Drawing Sheets

U.S. PATENT DOCUMENTS 6,396,816 B1 * 5/2002 Astle et al. .................. 370/264
6,631,118 B1 * 10/2003 Jones .......................... 370/252
6,657,993 B1 * 12/2003 Casanova et al. ........... 370/352

FOREIGN PATENT DOCUMENTS

JP      11-102351      4/1999
WO      WO 94/11975      5/1994

OTHER PUBLICATIONS

Harms et al, "Performance Modeling of A Channel Reservation Service", Computer Networks and ISDN Systems, vol. 27, No. 11, Oct. 1, 1995, pp. 1487-1497, XP000527054.

* cited by examiner

PREDICTIVELY ALLOCATED BANDWIDTH IN A COMMUNICATIONS NETWORK

BACKGROUND TO THE INVENTION

The present invention relates to a communications network, and in particular to a broadband network used to carry a circuit-connected service such as telephony.

In a conventional telephony network, a local exchange communicates call set-up information to a trunk exchange via a common channel signalling network. Similarly, trunk exchanges communicate via the common channel signaling network. An exchange is pre-configured to access a certain number of circuits in a fixed bearer network. Provided that one of these circuits is free, the exchange captures a circuit and uses the corresponding circuit identification code (CIC) on the common channel signalling network to associate call set-up information with the captured circuit resource in the fixed bearer network.

Increasingly, services such as voice telephony are being carried not over dedicated telephony networks, but over broadband networks designed to support a range of different services including, typically IP (Internet Protocol) data services. Typically, a number of permanent virtual circuits (PVCs) are pre-allocated to act as bearer channels for circuit-connected services such as telephony. Alternatively, if bandwidth on the broadband network is relatively scarce, then instead of the pre-allocated bearing circuits, switched virtual circuits (SVC) are established on a per-call basis as required.

The paper "An efficient reservation connection control protocol for gigabit networks", Varbarigos et al., Computer Networks and ISDN systems 30 (1998) 1135-1156 describes an efficient reservation virtual circuit (ERVC) protocol in which a start time field in a SETUP packet is set by the source node to the known round trip time for transmission to and from the destination node. Each intermediate node increments that field with a value for the delay on the incoming link from its preceding node, and reserves the capacity requested by the SETUP packet at a time offset from the receipt of the SETUP packet by the respective new value of that field. The destination node returns an ACK packet containing the final value of that field, and the source node delays for an amount equal to the difference between this final value of the field and its original value, and then sends a COMMIT packet followed by data packets. In this way, the COMMIT packet arrives at the final intermediate node exactly at the starting time of the reservation on the outgoing link to the destination node. Thus, maximum efficiency of reservation is achieved for this final intermediate node, and with progressively lesser values of efficiency for the preceding intermediate nodes, but always better efficiency than if the respectively reservations had been made upon transmission by the source node and receipt of the SETUP packet by the intermediate nodes.

SUMMARY OF INVENTION

According to a first aspect of the present invention, there is provide a method of operating a broadband communications network, including pre-allocating the amount of bandwidth on the network available for use for bearer channels for a circuit-connected service, characterised in that said pre-allocated amount of bandwidth is determined in accordance with a predictive time-dependent function so as to track expected changes in demand for bearer channels.

The present invention provides a new approach to operating a broadband network to support circuit-connected services. A predictive function is used to track expected changes in demand for circuits. For example, for a telephony network, historical data is generally available that will show a peak in demand during week day office hours, and a lower level of demand during early morning and late evenings. Using the present invention, the broadband network will automatically change the number of bearer channels provisioned for a telephony service. A trunk switch might have a base level of ten 84 kbit circuits during off peak hours, and may automatically establish a further ten circuits e.g. at 8 am on weekday and may also subsequently establish further circuits at 9 am to reach a peak value of, e.g. 40 circuits. In this way, by pre-allocating bearer channels based on a predictive time-dependent function, rather than solely allocating channels responsively as actual demand changes, efficient use is made of the network bandwidth by ensuring that circuits are not tying-up bandwidth when they are not needed, but at the same time the signalling overhead associated with the set-up of a particular call is minimised, since it is no longer necessary to establish virtual circuits on a per-call basis. Time need not be the sole factor determining bandwidth allocation. For example, the allocation may vary as a function both of time and of current traffic demand.

Preferably, the broadband network is a packet-switched network, and the pre-allocated amount of bandwidth is formed by a plurality of virtual circuits set up in the packet-switched network for use as bearer channels.

Preferably the method includes registering at an access node for the circuit-connected service the peak value of the number of bearer channels corresponding to the peak value of the pre-allocated amount of bandwidth, and while the current value of the pre-allocated amount of bandwidth is less than the peak value, then at the access node, in dependent upon the different between the current and peak values, marking one or more of the bearer channels as blocked.

This preferred implementation of the invention has the further advantage that it functions in a manner that is transparent to the circuit-connected service, and that is compatible with conventional narrowband common channel signalling protocols, such as ITU signalling system number 7 (SS7).

Preferably, when the network is a multi-service network, and respective proportions of said pre-allocated amount of bandwidth are pre-allocated to different ones of said services, the method includes automatically changing said respective proportions in accordance with a predictive time-dependent function. According to a second aspect of the present invention, there is provided a node for connection in a broadband communications network, the node comprising:
(a) a broadband network interface for connection to the broadband network;
(b) a signalling interface arranged to receive circuit set-up signals for a circuit-connected communications service;
(c) means for establishing bearer channels in the broadband network for carrying circuits allocated to the circuit-connected service; and
(d) control means programmed with a predictive time dependent control algorithm arranged automatically to change the amount of bandwidth pre-allocated for use for the bearer channels so as to track expected changes in demand for the bearer channels.

The invention also encompasses a communications network including a node in accordance with the second aspect.

DESCRIPTION OF THE DRAWINGS

Systems embodying the present invention will now be described in further detail, by way of example only, with reference to the accompanying drawings in which.

DESCRIPTION OF EXAMPLES

A broadband network 1 includes a number of nodes 2a, 2b. The broadband network 1 supports, in addition to other data services, a narrowband circuit-connected telephony service. Digital local exchanges 3a, 3b are connected via common channel signalling (SS7) and narrowband bearer (NBB) networks to respective nodes 2a, 2b. Customer telephones 4a, 4b are connected via local access networks to the digital local exchanges 3a, 3b.

As is described in further detail below, circuit management functions running on the nodes 2a, 2b establish a number of switched virtual circuits, SVC1, SVC2 . . . SVCn in the broadband network for use as telephony bearer channels. The number of channels at any given time is determined by a prediction function that varies the number up to some predetermined peak value, as a function of the time of day. The prediction function is derived from historical data for the traffic levels between any given pair of nodes.

Figure 3:
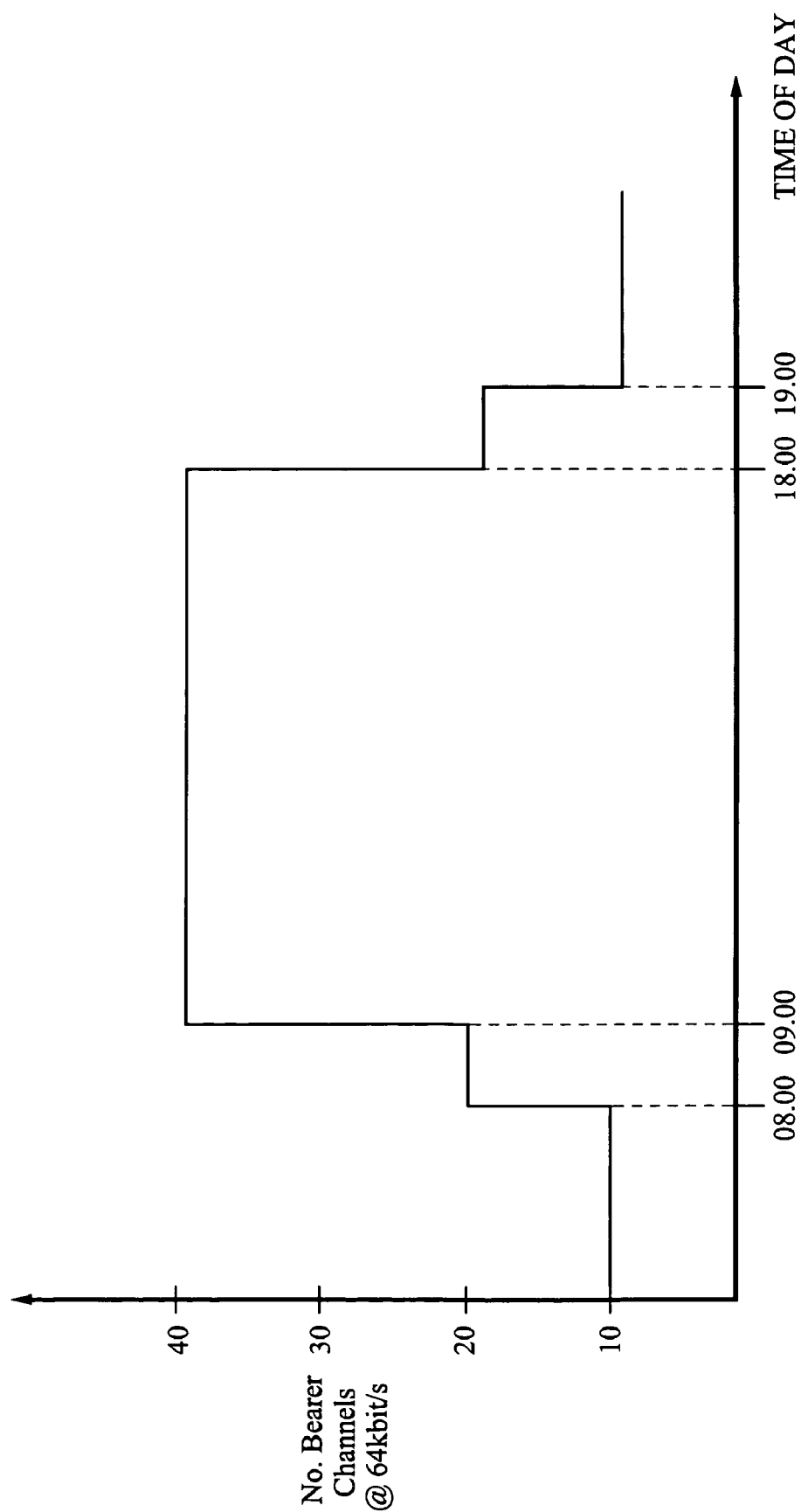
FIG. 3 shows an example prediction function for use in the nodes of FIG. 2.

FIG. 3 shows one example of a prediction function. In this case, the prediction function is a step function that provides an approximation to the expected level of demand at different times of the day. In this example, the base level provides for ten 64 kbit bearer channels. As 8 am, this is increased to twenty bearer channels and between 9 am and 6 pm a peak level of forty bearer channels is maintained. In a similar function, the number of channels is reduced step-wise at the end of the day. In addition to determining the number of bearer channels, the prediction function may also determine the allocation of channels to different service types in a multi-service network. For example, between 6 am and 9 am, 50% of the bearer channels are allocated to telephony, 20% to fax and 30% to connectionless data. During the day, the algorithm changes the allocations such that, by the evening, 30% of the network is allocated to telephony, 5% to fax and 65% to connectionless data. The algorithm prioritises services, such that, if by 9:30 am all telephony circuits are used 5% of the connectionless bandwidth is converted to telephony, and telephony circuits pre-allocated within it.

Each of the nodes 2a, 2b is a hybrid broadband/narrowband node and supports a narrowband-SS7 (signalling system number 7) signalling point and has an associated narrowband bearer terminating function. In the SS7 domain, the maximum number of circuits per route between narrowband SS7 signalling points is configured in accordance with the maximum allowed by the prediction algorithm for that route. However, until a real broadband bearer has been associated with a N-SS7 circuit, the N-SS7 circuit is marked as blocked in the N-SS7 protocol. The predictor algorithm is configured to keep the real bearer bandwidth just ahead of demand, up to the maximum number of circuits configured to N-SS7. The algorithm is driven by historical data, for example for time of day and/or for day of week and may also be modified by (near) real time input such as traffic demand, rate of change of traffic demand etc.

When the prediction function at one of the nodes 2a, 2b decides to increase the real bearer capacity, then it co-operates with the node at the other end of the N-SS7 route. Broadband signalling is used to establish a bearer between the node narrowband bearer terminating functions and this signalling association is used to convey data identifying the associated N-SS7 route and CIC (SS7 circuit identification code). After negotiating linkages and establishing the real bearer, the N-SS7 unblocks the circuit using standard N-SS7 procedures. The circuit is then available for use. Real parameters associated with the broadband bearer, for example the propagation delay counter value, may be passed to the N-SS7 signalling function for use in N-SS7 call establishment messages. This requires such information to be stored per circuit, per route. Alternatively a compromise (average) value may be stored per route if significant per call variations are not expected in the broadband network.

A circuit established in this manner continues in use by the N-SS7 route for as long as it is required in accordance with the prediction function. Normal N-SS7 procedures can then use the circuit without requiring modification. When the prediction function determines that the real bandwidth in a N-SS7 route can be reduced, for example in the case of the function shown in FIG. 3, at 6 o'clock (p.m.) when the required number of bearer channels drops from forty channels to twenty channels, then conventional N-SS7 procedures are used to block the surplus circuits. In this example therefore, twenty of the forty circuits are marked as blocked from 18.00 hrs to 19.00 hrs. Once a circuit is blocked and idle, then the real bandwidth and CIC associations are released using conventional broadband protocols.

Figure 1:
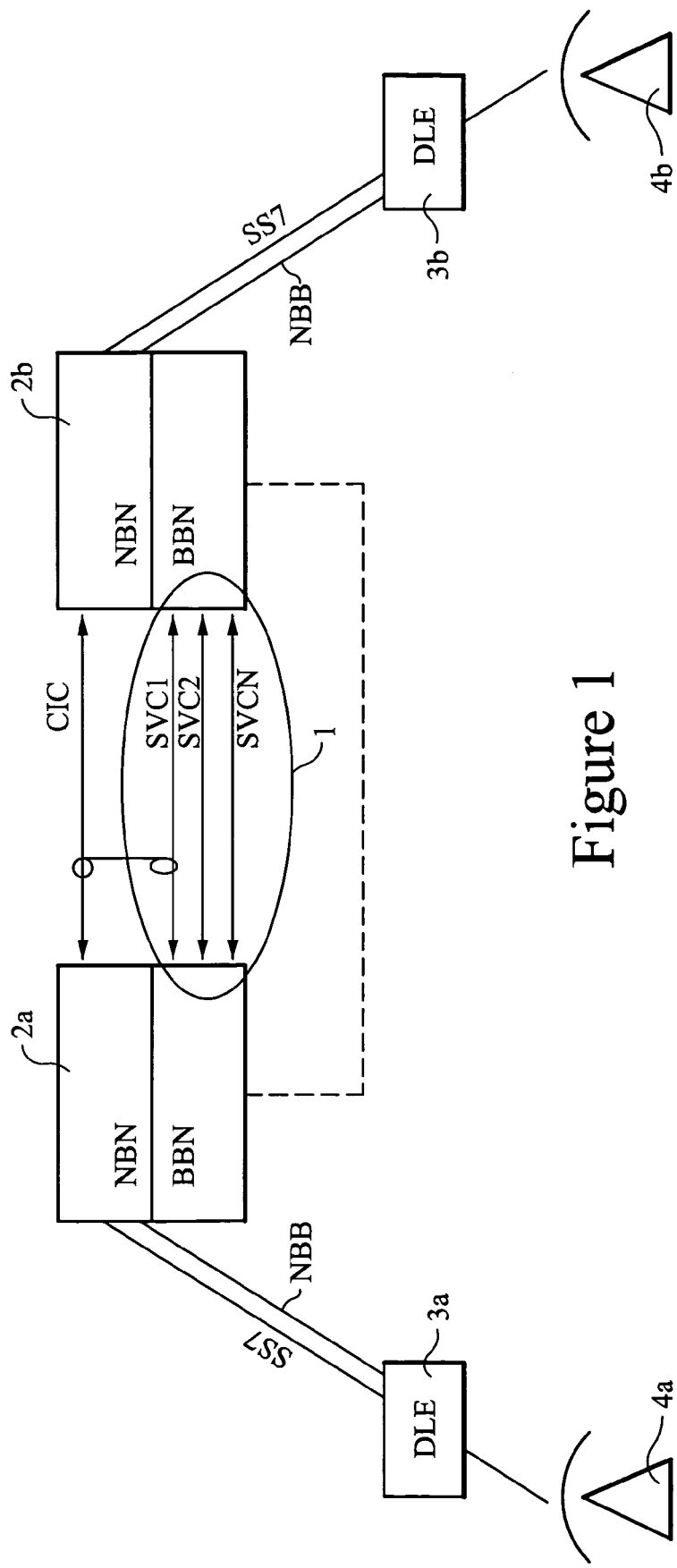
FIG. 1 is a schematic of a network embodying the present invention.
Figure 2:
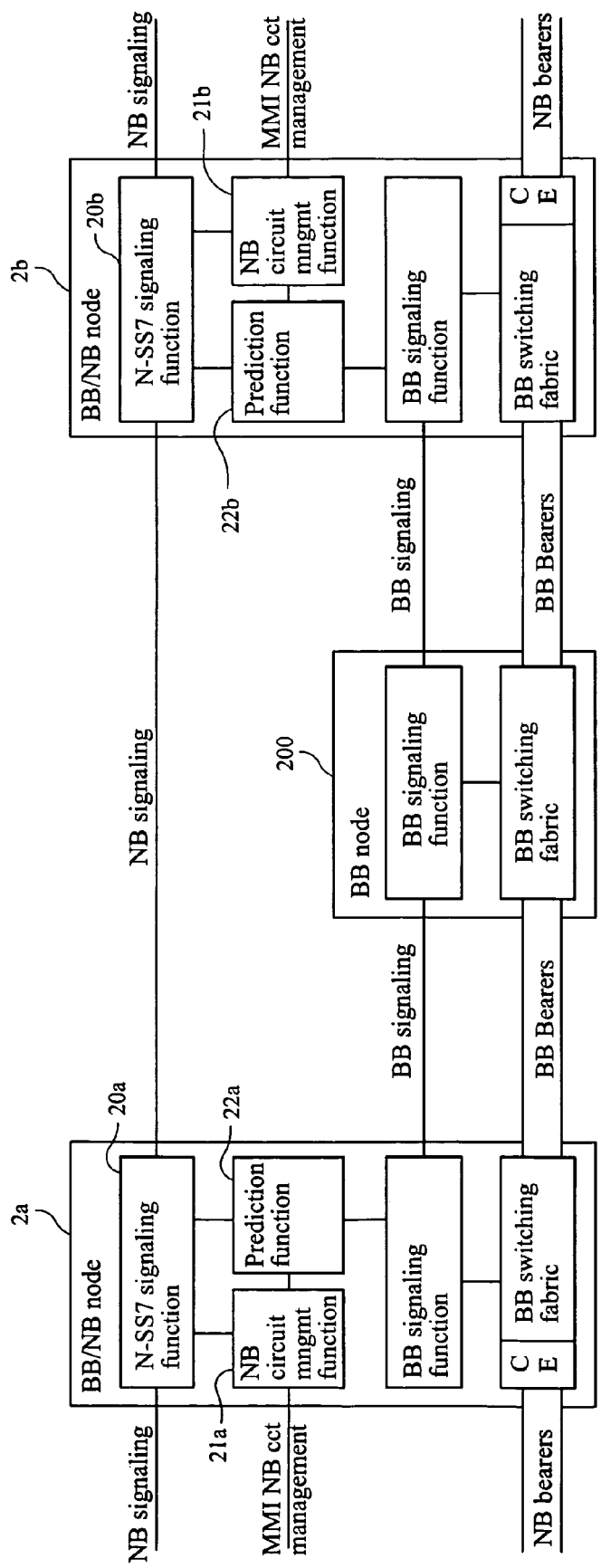
FIG. 2 is a diagram showing in further detail the core network and nodes of the network in FIG. 1.

FIG. 2 shows in further detail the interfaces within the nodes, and between the nodes and a further intermediate broadband node 200. The principal components of each node are an N-SS7 signalling processor 20a, 20b, a narrowband circuit management function 21a, b and prediction function 22a,b. The prediction function has interfaces to the narrowband signaling processor, the broadband signaling processor and to the narrowband circuit management function. The broadband signaling processor in turn controls broadband switching fabric. In this example, the broadband network is an ATM (Asynchronous Transfer Mode1) network, and accordingly the broadband switching fabric is an ATM switch. Other nodes in the network such as the node 200 shown in FIG. 2, may function only in the broadband domain. Nonetheless, the broadband signaling required for establishing the bearer channel can pass transparently through such intermediate nodes.

Figure 4A:
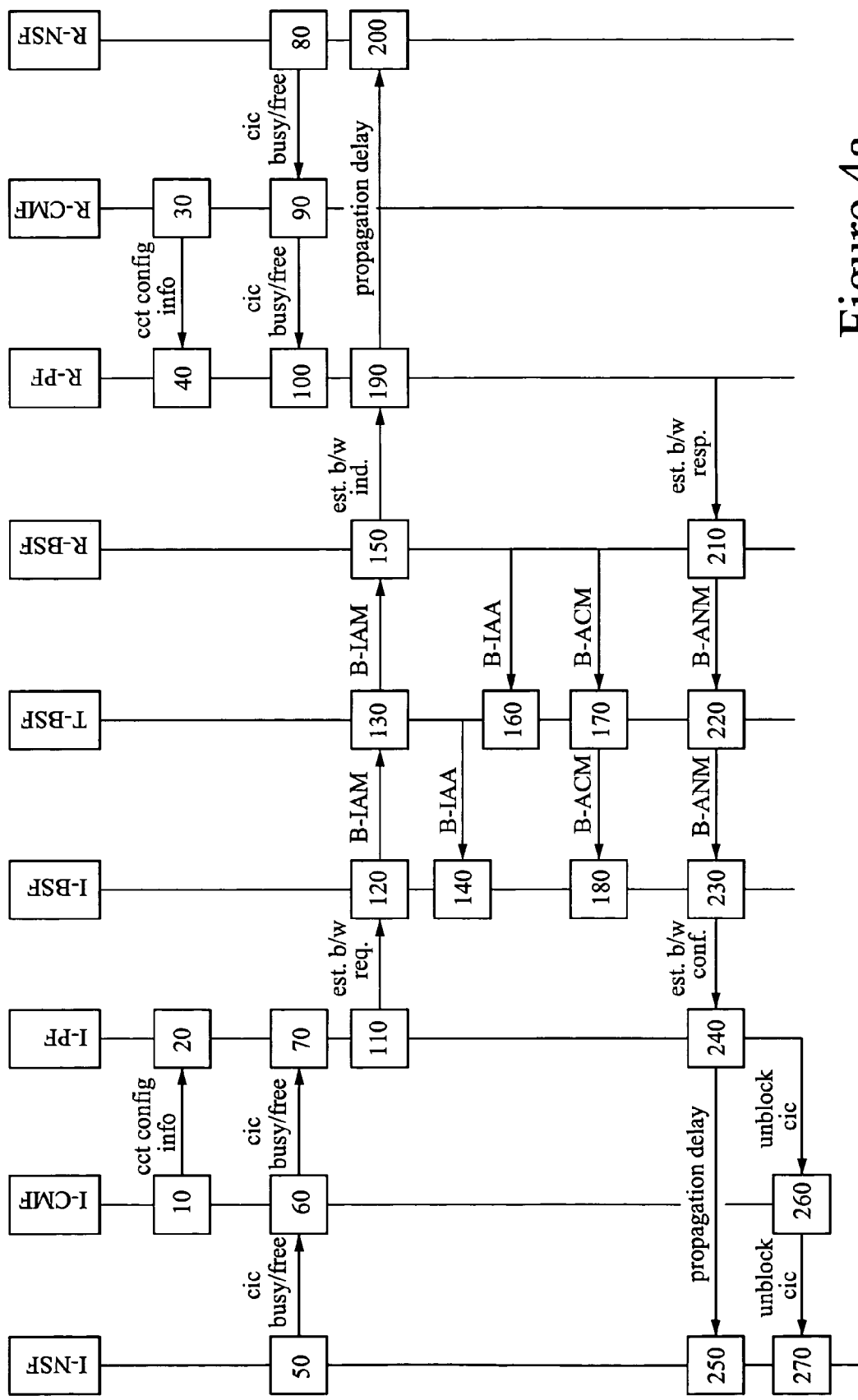
FIGS. 4a and 4b are message flow diagrams.
Figure 4B:
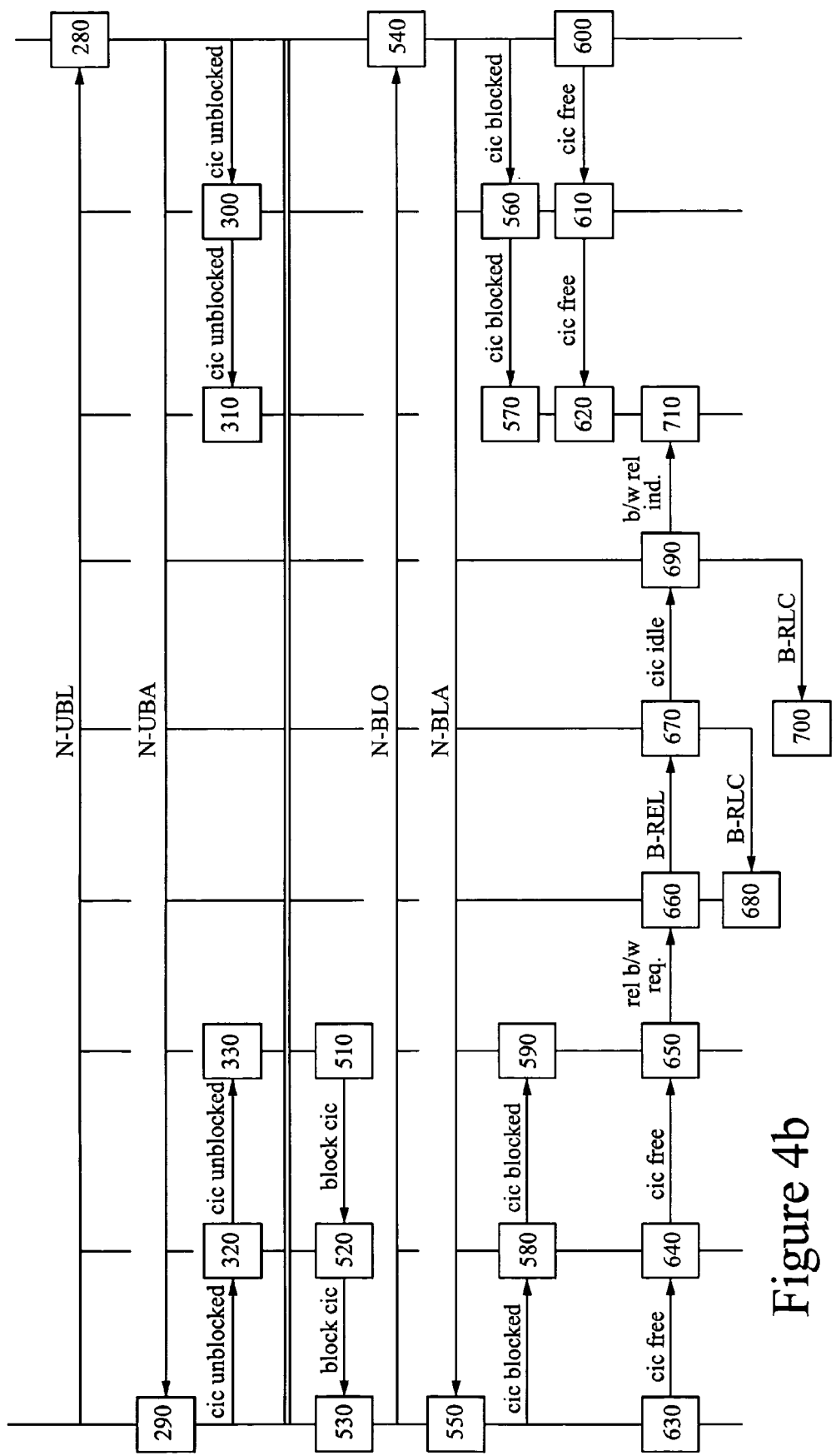

In the case of this ATM broadband network, the broadband signalling protocol is B-ISUP (Broadband ISDN User Part). An example of message flows in such a network when implementing the invention will be described in further detail with reference to the components shown in FIGS. 4a and 4b. The numbers at the beginning of the following paragraphs denote the corresponding block numbers shown in FIGS. 4a, 4b.

10-330 Establishing Additional Bandwidth

10 When a N-SS7 route is configured, information about the narrowband route capabilities are transferred from the Narrowband circuit management function to the corresponding Prediction function for the route. There is one Prediction function per narrowband route. Information transferred includes: the Narrowband transmission medium capability configured for the route (from the N-SS7 perspective); the N-SS7 originating point code (OPC) and destination point code (DPC) of the route; and the circuit identification (CIC) range configured for the route. At configuration, N-SS7 regards all CICs as N-SS7 blocked. Under normal N-SS7 operating conditions there are a mixture of blocked and available CICs for the route.

20 Normal operation of the Prediction function requires an agreement for each route to determine the end which will take responsibility for running the prediction algorithm. This end is known as the "initiating node". The other end is known as the "remote node". Symmetric operation would be possible but would require additional procedures to synchronise the two Prediction functions and handle clashes for example if each end tried to establish the bandwidth for a CIC at the same time.

30/40 As 10/20

50 The narrowband signalling function keeps the Narrowband circuit management function aware of CIC status (normal action).

60 The Narrowband circuit management function keeps the Prediction function aware of CIC status.

70 The initiating Prediction function uses (near) real CIC status information to monitor route traffic conditions and assess the suitability of the available route bandwidth.

80/90 As 50/60.

100 The remote Prediction function monitors CIC status information.

110 When the initiating Prediction function determines that additional bandwidth is required to meet the current narrowband traffic demand (up to the maximum pre-configured in N-SS7) it initiates establishment of a broadband connection via the initiating Broadband signalling function.

120 When requested by the initiating Prediction function the initiating Broadband signalling function sends a B-IAM (Broadband Initial Address Message) towards the remote Broadband signalling function. The called party number addresses the remote Prediction function. The requested broadband transfer capability matches the NB transmission medium capability configured for the route. For basic emulation of N-SS7 the broadband transfer capability requirement is for 64 kbit/s constant bit rate. However, if the N-SS7 route has been configured for selection under more stringent N-SS7 criteria then the broadband transfer capability may be tailored to suit the N-SS7 requirement (e.g. speech, 3.1 kHz, Audio, Group 2/3 facsimile, etc.) depending on the capabilities of the broadband signalling. Additionally there is specific information included in the B-IAM to indicate that bandwidth is being requested to support N-SS7. This information conveys the corresponding N-SS7 route/circuit identity (OPC/DPC/CIC) (originating point code/destinction point code/circuit identification code) from the initiating Prediction function to the remote Prediction function and may be embedded in the Prediction function addressing scheme or may be a new parameter with parameter compatibility information which indicates "pass-on" and "release call if pass-on not possible". To protect the remote Prediction function from unauthorised access the B-IAM includes the calling line identity which identifies the initiating Prediction function. For additional protection the Closed User Group (CUG) supplementary service may be utilised.

130/140 Basic B-ISUP Behaviour.

150 In addition to Basic B-ISUP behaviour, the remote Broadband signalling function indicates to the remote Prediction function that that additional bandwidth is required to meet the current narrowband traffic demand. This indication includes information about the propagation delay of the bearer (if supported by the Broadband signalling protocol, e.g. B-ISUP Propagation delay counter parameter). If the Prediction functions are being protected by the CUG supplementary service then invalid (failed CUG) requests are not passed to the remote Prediction function.

160/170/180 Basic B-ISUP Behaviour.

190 On receiving the indication from the remote Broadband signalling function that additional bandwidth is required to meet the current narrowband traffic demand the remote Prediction function checks the requirements against its own data. To accept the request the remote Prediction function requests the remote Broadband signalling function to accept the call. If the request is accepted, the propagation delay (if available) is passed to the Narrowband signalling function for use during subsequent narrowband call establishment signalling. Under exceptional conditions, the remote Prediction function may reject the request and indicate the reason for rejection. Reasons for rejection include: unrecognised initiating Prediction function (CLI check failed); route identified by OPC/DPC not configured at remote Narrowband signalling function; identified CIC not configured at remote Narrowband signalling function; bandwidth already allocated to identified CIC; and originator of request is not "initiator" for this route.

200 The Narrowband signalling function records the bearer propagation delay as data against the particular CIC for use during narrowband call establishment signalling (when the CIC is subsequently unblocked).

210 To accept the call a B-ANM is returned towards the initiating Broadband signalling function. To reject the call a B-REL including specific rejection information is returned towards the initiating Broadband signalling function. This information identifies the reason for rejection and has parameter compatibility information which indicates "pass-on" and "discard parameter if pass-on not possible".

220 Basic B-ISUP Behaviour.

230 In addition to Basic B-ISUP behaviour, the initiating Broadband signalling function indicates to the initiating Prediction function that that the requested additional bandwidth is available. This indication includes information about the propagation delay of the bearer (if supported by the Broadband signalling protocol, e.g. B-ISUP Call history information parameter). If the call request has failed then the initiating Broadband signalling function indicates to the initiating Prediction function the reason for rejection (either as received from the remote Prediction function or as determined by basic call failure).

240 Once the bandwidth is confirmed the initiating Prediction function passes the propagation delay (if available) to the Narrow band signalling function for use during narrowband call establishment signalling and then requests the initiating Narrowband circuit management function to unblock the CIC for N-SS7 call control to use. If the initiating Prediction function is aware that bandwidth has been made available for several CICs then the narrowband circuit group unblocking procedures may be invoked. Any failure to establish bandwidth is analysed by the initiating Prediction function. Basic broadband call establishment failure may result in the initiating Prediction function making another attempt to establish bandwidth. Specific errors received from the remote Prediction function are reported to system management as faults.

250 The Narrowband signalling function records the bearer propagation as data against the particular CIC for use during narrowband call establishment signalling (when the CIC is subsequently unblocked).

260 On request from the initiating Prediction function the initiating Narrowband circuit management function shall initiate unblocking of the CIC via normal procedures in N-SS7. Interaction with existing MMI and N-SS7 blocking/unblocking procedures is required.

270 On request from the initiating Narrowband circuit management function normal N-SS7 unblocking procedures are invoked.

280 Normal N-SS7 unblocking procedures including an indication to the remote Narrowband circuit management function that the CIC is available for use by N-SS7.

290 Normal N-SS7 unblocking procedures including an indication to the initiating Narrowband circuit management function that the CIC is available for use by N-SS7.

300/310 The remote Narrowband circuit management function advises the remote Prediction function that the CIC is unblocked.

320/330 The initiating Narrowband circuit management function advises the initiating Prediction function that the CIC is unblocked.

510-710 Releasing Surplus Bandwidth

510 When the initiating Prediction function determines that the provided bandwidth is more than required it requests the initiating Narrowband circuit management function to initiate narrowband circuit blocking procedures. If multiple circuit bandwidth can be released then the narrowband circuit group blocking procedures may be invoked.

520 On request from the initiating Prediction function the initiating Narrowband circuit management function shall initiate blocking of the CIC(s) via normal procedures in N-SS7. Interaction with existing MMI and N-SS7 blocking/unblocking procedures is required.

530 On request from the initiating Narrowband circuit management function normal N-SS7 blocking procedures are invoked.

540 Normal N-SS7 blocking procedures including an indication to the remote Narrowband circuit management function that the CIC has been blocked by N-SS7.

550 Normal N-SS7 unblocking procedures including an indication to the initiating Narrowband circuit management function that the CIC has been blocked by N-SS7.

560 The Narrowband circuit management function keeps the Prediction function aware of CIC status. If the CIC is already idle (not being used for a call) then the indication to the Prediction function will identify "blocked/free" status.

570 The Prediction Function Monitors CIC Status.

580/590 As 560/570.

600 The Narrowband signalling function keeps the Narrowband circuit management function aware of CIC status (normal action). In particular, if the CIC was being used for a call when the blocking procedures were completed, a CIC free indication will be made when the call clears.

610 The Narrowband circuit management function keeps the Prediction function aware of CIC status.

620 The Prediction Function Monitors CIC Status.

630/640 As 600/610.

650 Once the initiating Prediction function is aware that the CIC is both blocked and free, then it initiates release of the bandwidth by sending a release bandwidth request to the initiating Broadband signalling function. Alternatively, if determined by the initiating Prediction function the bandwidth release procedure may be aborted at this stage and the bandwidth returned to service by invoking the N-SS7 procedures to unblocking the CIC.

660 When the release bandwidth request is received the initiating Broadband signalling function initiates normal broadband release procedures by sending a B-REL.

670/680 Basic B-ISUP Behaviour.

690 In addition to the Basic B-ISUP behaviour the remote Broadband signalling function shall send a bandwidth release indication to the remote Prediction function.

700 Basic B-ISUP Behaviour.

710 On receipt of the bandwidth released indication, if the CIC is blocked and free the remote Prediction function shall note that bandwidth is no longer allocated to the CIC.

Receipt of Unexpected Bandwidth Released Indication at a Prediction Function

If the Prediction function receives a bandwidth released indication and the CIC is not blocked the following applies.

At a remote Prediction function, the remote Narrowband circuit management function is advised that the CIC is faulty and unavailable for calls. Any narrowband call in progress is released using N-SS7 procedures. The exceptional condition remains in the remote Narrowband circuit management function until the CIC status returns to blocked/free as a result of actions at the initiating Prediction function.

At an initiating Prediction function, the initiating Narrowband circuit management function is advised to initiate blocking of the CIC. Any narrowband call in progress is released using N-SS7 procedures. Once blocking is confirmed, the initiating Prediction function may decide to re-establish the lost bandwidth using the procedures described above.

The invention is applicable to many other types of network. For example, in an IP network a predictive algorithm might be used to control, e.g., the proportion of network bandwidth allocated to telephony, to fax, to data services at different times.

The invention claimed is:

1. A method for operating a broadband communications network, said method comprising:
   pre-allocating the amount of bandwidth on the network available for use for bearer channels for a circuit-connected service;
   determining said pre-allocated amount of bandwidth in accordance with a predictive time-dependent function so as to track expected changes in demand for bearer channels;

registering at an access for the circuit-connected service the peak value of the number of bearer channels corresponding to the peak value of said pre-allocated amount of bandwidth;

while the current value of said pre-allocated amount of bandwidth is less than said peak value of said pre-allocated amount of bandwidth, then at the access node, in dependent upon the difference between said current and peak values, marking one or more of the bearer channels as blocked.

2. A method as in claim 1 in which the broadband network is a packet-switched network, and said pre-allocated amount of bandwidth is formed by a plurality of virtual circuits set up in the packet-switched network for use as bearer channels.

3. A method as in claim 1 wherein said predictive time-dependent function is based, at least in part, upon a rate of change in traffic demand.

4. A node for connection in a broadband communications network, the node comprising:
(a) a broadband network interface for connection to the broadband network;
(b) a signaling interface arranged to receive circuit set up signals for a circuit-connected communications service;
(c) means for establishing bearer channels in the broadband network for carrying circuit allocated to the circuit-connected service; and
(d) control means programmed with a predictive time dependent control algorithm arranged automatically to change the amount of bandwidth pre-allocated for use for the bearer channels based, at least in part, upon a rate of change in traffic demand so as to track expected changes in demand for the bearer channels.

5. A node as in claim 4, in which the node is arranged for connection in a multi-service network, respective proportions of said pre-allocated amount of bandwidth are pre-allocated to different ones of said services, and wherein the said control algorithm is arranged automatically to change said respective proportions in accordance with a predictive time-dependent function.

6. A node as in claim 4, including means for routing packets conforming to an internetworking protocol.

7. A communication network including a node according to claim 4.

* * * * *